(12) United States Patent
Nanno et al.

(10) Patent No.: US 6,772,744 B2
(45) Date of Patent: Aug. 10, 2004

(54) PCV APPARATUS

(75) Inventors: Keishi Nanno, Nishikamo-gun (JP); Hitoki Nishino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/310,041

(22) Filed: Dec. 5, 2002

(65) Prior Publication Data

US 2003/0140908 A1 Jul. 31, 2003

(30) Foreign Application Priority Data

Jan. 25, 2002 (JP) ........................................ 2002-016583

(51) Int. Cl.⁷ ................................................ F01M 13/00
(52) U.S. Cl. ..................................................... 123/572
(58) Field of Search .................................. 123/572–574

(56) References Cited

U.S. PATENT DOCUMENTS

| | | | | |
|---|---|---|---|---|
| 3,779,221 A | * | 12/1973 | Gartner ....................... | 123/572 |
| 4,768,493 A | * | 9/1988 | Ohtaka et al. ............... | 123/573 |
| 4,922,882 A | * | 5/1990 | Topfer ......................... | 123/572 |
| 6,390,080 B1 | * | 5/2002 | Dowding et al. ........... | 123/572 |
| 6,412,479 B1 | * | 7/2002 | Canfield ...................... | 123/573 |

FOREIGN PATENT DOCUMENTS

JP    U 4-93710    8/1992

* cited by examiner

Primary Examiner—Marguerite McMahon
(74) Attorney, Agent, or Firm—Oliff & Berridge, PLC

(57) ABSTRACT

A PCV apparatus for returning, in an engine having a crankcase and an intake system, blowby gases leaked into the crankcase back to the intake system includes a PCV piping forming at least part of a path through which the blowby gases return, and a bracket as a heat transmitting member connecting a prescribed portion of the engine and the PCV piping, enabling heat transmission.

16 Claims, 2 Drawing Sheets

PCV APPARATUS

BACKGROUND OF THE INVENTION

1. Field of the Invention

The present invention relates to a PCV apparatus used for an engine of an automobile and the like. The PCV stands for Positive Crankcase Ventilation, and the PCV apparatus is a blowby gas returning apparatus.

2. Description of the Background Art

Generally, in an engine, mixture of fuel and air is combusted in a cylinder to generate energy, which is consumed by a piston for performing stroke motion. Some of the mixture does not burn and leaks into a crankcase through a gap of the piston. Such mixture of fuel and air leaking into the crankcase is referred to as blowby gases. The blowby gases include a large amount of incombustible gases such as carbon monoxide, hydrocarbon, and the like. The purpose of the PCV apparatus is to prevent the emission of such blowby gas into the atmosphere. FIG. 3 shows one example of an engine with the PCV apparatus. In the engine, a cylinder head 3 and cylinder block 4 are combined, with a head cover 2 covering over cylinder head 3. As shown in FIG. 3, in this engine the blowby gases are guided by a PCV piping 5 of the PCV apparatus which extends from the crankcase via head cover 2 to an intake manifold 10 which constitutes a part of an intake system.

The blowby gases contain a small amount of moisture. As such, the aforementioned engine with PCV piping 5 has been suffering from the malfunction of the PCV apparatus when used in cold climates, due to the moisture being frozen in the PCV piping.

Therefore, in order to prevent the moisture in the PCV piping from freezing, as shown in FIG. 4, it has been proposed to implement the PCV piping by a hose 21 passing blowby gases and a thermal insulating protector 22 wrapping the same. Further, as shown in FIG. 5, an arrangement is proposed in Japanese Utility Model Laying-Open No. 4-93710 in which hose 21 is provided with an external coaxial water path tube 23, to cause warm water to flow through the resulting space therebetween. Another proposed arrangement is shown in FIG. 6, in which hose 21 and water path tube 24 are positioned next to each other and brazed together, to cause warm water to flow through water path tube 24.

With any one of the arrangements of FIGS. 4 to 6, however, PCV piping 5 occupies much space and further complicates the arrangement, thus increasing the costs undesirably. In order to attain compactness, it has also been once contemplated to scale the overall structure down, which involved reduction of the diameter of the hose passing the blowby gasses. In such a case, undesirable clogging tends to occur in the hose, and thus the risk of freezing increases against the original intention.

SUMMARY OF THE INVENTION

The object of the present invention is to provide a PCV apparatus which prevents piping from freezing with a compact arrangement, which can be implemented at low cost.

In order to achieve the aforementioned object, the PCV apparatus according to the present invention returns, in an engine having crankcase and an intake system, blowby gases leaked into the crankcase back to the intake system. The PCV apparatus includes a PCV piping forming at least part of a path through which the blowby gases return, and a heat transmitting member connecting a prescribed portion of the engine and the PCV piping, enabling heat transmission. By employing this arrangement, heat of the engine is transmitted to the PCV piping via the heat transmitting member, and thus the moisture in the PCV piping is prevented from freezing.

Preferably in the aforementioned invention, the prescribed portion of the engine is a heat emitting region which emits heat resulted from a combustion or frictional motion therein. By employing this arrangement, the heat from the heat emitting region can continuously be transmitted to the PCV piping, ensuring that the moisture of the PCV piping will not be frozen.

Preferably in the aforementioned invention, the PCV piping is mainly made with metal. By employing this arrangement, since the PCV piping is mainly made with metal and thus has high thermal conductivity, it can receive heat from the heat transmitting member quickly, ensuring that the moisture of the PCV piping will not be frozen.

Preferably in the aforementioned invention, the heat transmitting member is made of a material having higher thermal conductivity than the PCV piping. By employing this arrangement, the heat transmitting member will distribute heat widely in itself quickly, before transmitting heat from the engine to the PCV piping, thus passing heat to wide range of the PCV piping.

Preferably in the aforementioned invention, the PCV piping is arranged outside to the engine at a portion where the PCV piping is not subjected to the air flow generated by driving an automobile with the engine. By employing this arrangement, the PCV piping will not be cooled, since it will not be subjected to the air flow generated by driving an automobile directly, and thus the moisture in the PCV piping is prevented from freezing.

The foregoing and other objects, features, aspects and advantages of the present invention will become more apparent from the following detailed description of the present invention when taken in conjunction with the accompanying drawings.

DESCRIPTION OF THE PREFERRED EMBODIMENT (First Embodiment)

Figure 1:
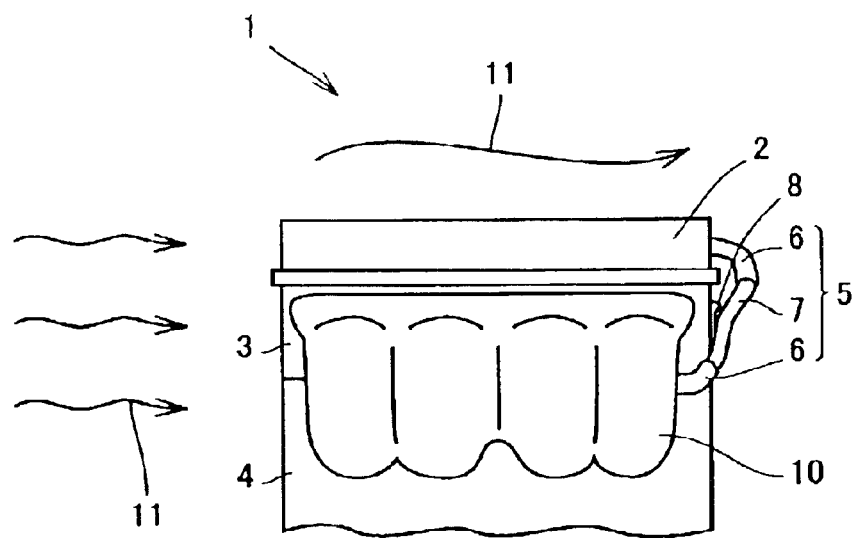
FIG. 1 is a side view of an engine with a PCV apparatus according to a first embodiment of the present invention.
Figure 2:
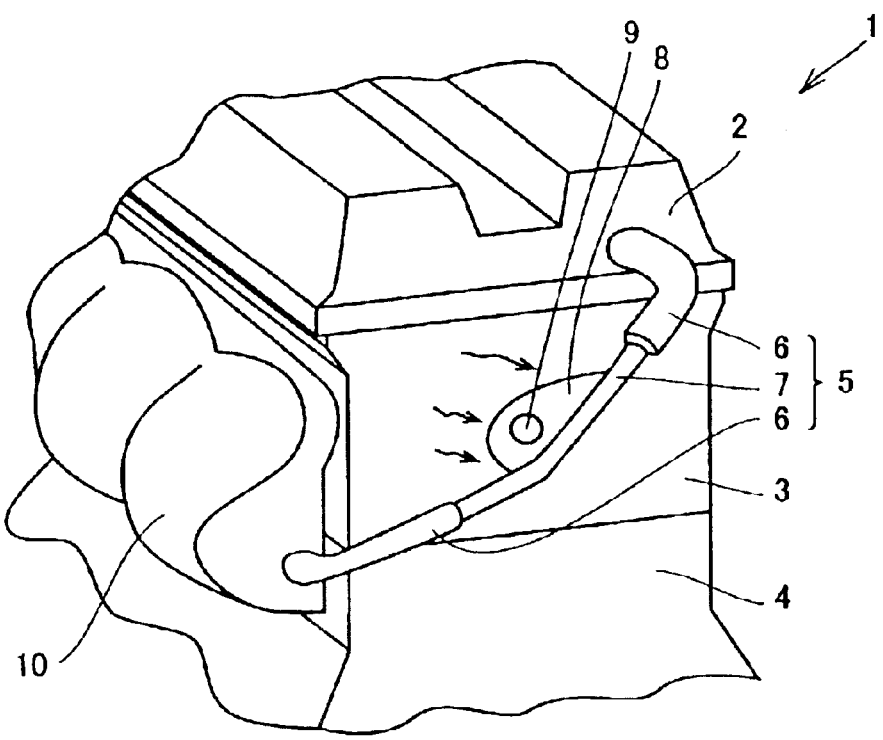
FIG. 2 is a partial perspective view of the engine with the PCV apparatus according to the first embodiment of the present invention.
Figure 3:
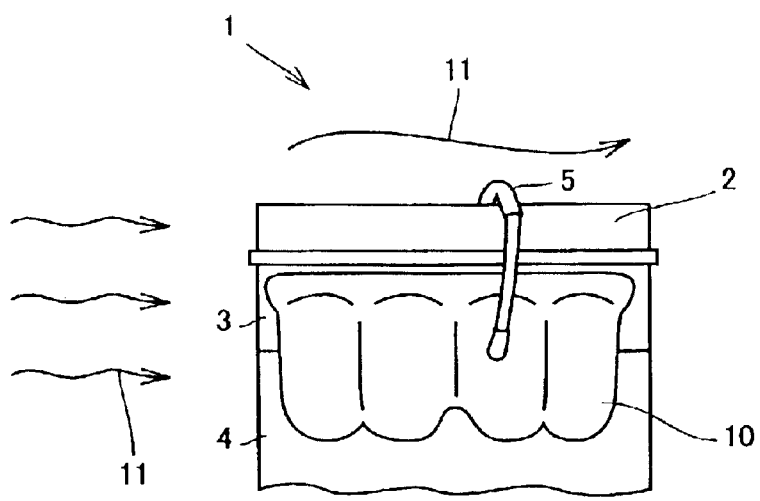
FIG. 3 is a side view of an engine with a PCV apparatus according to the prior art.
Figure 4:
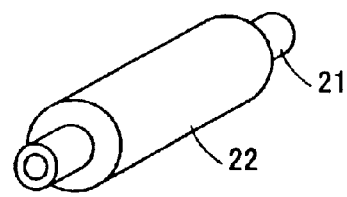
FIG. 4 shows a first proposed example for prevention of freezing for a PCV piping of a PCV apparatus according to the prior art.
Figure 5:
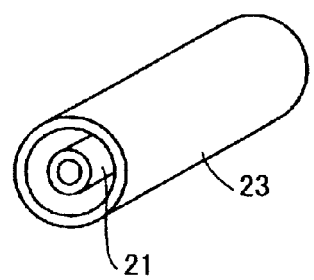
FIG. 5 shows a second proposed example for prevention of freezing for a PCV piping of a PCV apparatus according to the prior art.
Figure 6:
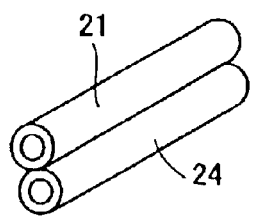
FIG. 6 shows a third proposed example for prevention of freezing for a PCV piping of a PCV apparatus according to the prior art.

Referring to FIGS. 1 and 2, a PCV apparatus according to a first embodiment of the present invention will be described. The PCV apparatus is mounted on an engine 1 and includes a PCV piping 5 and a bracket 8 as a heat transmitting member. In FIG. 1, the left side of the figure corresponds to the direction to which an automobile moves (the front side), and right side of the figure corresponds to the other side (the rear side). PCV piping 5 is placed on engine 1 at the rear side. Specifically, as shown in FIG. 2 in more detail, it extends from a head cover 2 over the rear side of engine 1 and connected to an intake manifold 10. The PCV apparatus is set to cause blowby gases to flow into PCV piping 5 utilizing the negative pressure of intake manifold 10. The PCV apparatus includes a PCV valve (not shown) for regulating the amount of blowby gases flowing through PCV piping 5 by opening and closing the PCV valve corresponding to the magnitude of the negative pressure of intake manifold 10.

PCV piping 5 includes tips 6 made of rubber and a middle portion 7 made of metal. Middle portion 7 of PCV piping 5 is provided with a bracket 8 extending externally therefrom, positioned to be in contact with a cylinder head 3 and fixed to the cylinder head 3 by a bolt 9. Bracket 8 is made of metal as well as middle portion 7.

In the present PCV apparatus, PCV piping 5 is connected to a portion of engine 1 with bracket 8 as a heat transmissive member intervening therebetween, so that heat can be transmitted. Further, the connected portion is cylinder head 3, i.e., the region emitting heat resulted from fuel combustion in the engine or the frictional motion of the piston. As such, heat generated in the engine will be transmitted to the PCV piping through the heat transmitting member, thus moisture in the PCV piping can be prevented from freezing.

Further, since PCV piping 5 is placed at the rear side of the engine, even when the automobile is driven and an air flow 11 (See FIG. 1) is generated, PCV piping 5 will not be subjected directly to the air flow 11. Thus, the moisture in the PCV piping can be prevented from freezing.

Additionally, middle portion 7 which constitutes the main part of PCV piping 5 is made of metal and thus has superior thermal conductivity, capable of receiving the transmitted heat from the heat transmitting member quickly and preventing the moisture in PCV piping 5 from freezing. The material of the main part of PCV piping 5 is preferably one with superior thermal conductivity, such as copper.

In the present embodiment, although bracket 8 as one example of heat transmitting member is shown to be fixed on cylinder head 3 by bolt 9, the shape and structure of the heat transmitting member is not limited to the bracket as long as it transmits heat sufficiently. Similarly, the manner of fixing to the engine body is not limited to bolt fixing if heat is transmitted.

Preferably, the heat transmitting member is made of material having thermal conductivity higher than that of the material of the PCV piping. Then, the heat transmitting member will distribute heat quickly in the wide range of itself, before transmitting heat from the engine to the PCV piping.

In the present embodiment, though the portion to which the heat transmitting member is connected is shown as the rear side of cylinder head 3 in the outer surface of the engine, it may be other portion if it emits heat during the operation of the engine. It should be noted, however, that when connection is made at cylinder block 4 in FIG. 2, PCV piping 5 from head cover 2 must extend to the lower position for reaching cylinder block 4, and then extend upward for connecting to intake manifold 10. Such arrangement of PCV piping 5 results in a path having a part lower than its inlet and outlet, which may trap water that may freeze, and therefore, it is not preferable. Accordingly, PCV piping 5 is preferably routed from the higher portion to the lower portion of the engine. Additionally, as stated above, it is preferable to select the rear side, since it is less susceptible to the air flow generated by driving the automobile.

According to the present invention, since heat of the engine, preferably heat from the heat emitting region of the engine, can be transmitted to the PCV piping via the heat transmitting member continuously, the moisture in the PCV piping can be prevented from freezing. Additionally, by placing the PCV piping at the side corresponding to the rear side of the automobile, it will not be subjected directly to the air flow generated by driving the automobile, thus the moisture in the PCV piping can be prevented from freezing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A PCV apparatus for returning, in an engine having a crankcase and an intake system, blowby gases leaked into said crankcase back to said intake system, comprising:
    a PCV piping forming at least part of a path through which said blowby gases return; and
    a heat transmitting member connecting a prescribed portion of said engine and said PCV piping, enabling heat transmission, said heat transmitting member being made with a material having thermal conductivity higher than that of said PCV piping.

2. The PCV apparatus according to claim 1, said prescribed portion of said engine being a heat emitting region emitting heat resulted from a combustion or frictional motion therein.

3. The PCV apparatus according to claim 1, said PCV piping being mainly made with metal.

4. The PCV apparatus according to claim 2, said PCV piping being mainly made with metal.

5. The PCV apparatus according to claim 1, said PCV piping being arranged external to said engine at one side not being directly subjected to the air flow generated by driving an automobile with said engine.

6. A PCV apparatus for returning, in an engine having a crankcase and an intake system, blowby gases leaked into said crankcase back to said intake system, comprising:
    a PCV piping forming at least part of a path through which said blowby gases return; and
    a heat transmitting member connecting a prescribed portion of said engine and said PCV piping, enabling heat transmission, said PCV piping being arranged external to said engine at one side not being directly subjected to the air flow generated by driving an automobile with said engine.

7. The PCV apparatus according to claim 6, said prescribed portion of said engine being a heat emitting region emitting heat resulted from a combustion or frictional motion therein.

8. The PCV apparatus according to claim 6, said PCV piping being mainly made with metal.

9. The PCV apparatus according to claim 7, said PCV piping being mainly made with metal.

10. The PCV apparatus according to claim 6, said heat transmitting member being made with a material having thermal conductivity higher than that of said PCV piping.

11. A PCV apparatus for returning, in an engine having a crankcase and an intake system, blowby gases leaked into said crankcase back to said intake system, comprising:

a PCV piping forming at least part of a path through which said blowby gases return, said PCV piping having a first port, a second port, and a transition section located between the first and the second port; and a heat transmitting member connecting a prescribed portion of said engine with said transition section of said PCV piping for heat transmission, the heat transmitting member extending externally from the transition section.

12. The PCV apparatus according to claim 11, said prescribed portion of said engine being a heat-emitting region emitting heat resulted from a combustion or frictional motion therein.

13. The PCV apparatus according to claim 11, said PCV piping being mainly made with metal.

14. The PCV apparatus according to claim 11, said heat transmitting member being made with a material having thermal conductivity higher than that of said PCV piping.

15. The PCV apparatus according to claim 11, said PCV piping being arranged external to said engine at one side not being directly subjected to the air flow generated by driving a vehicle with said engine.

16. The PCV apparatus according to claim 11, said first port being connected to a head cover of said engine and said second port is connected to an intake manifold.

* * * * *